April 7, 1959  S. A. SCHERBATSKOY  2,881,324
RADIATION DETECTOR
Filed Jan. 4, 1954  2 Sheets-Sheet 1

INVENTOR.
Sage A Scherbatskoy

United States Patent Office 2,881,324
Patented Apr. 7, 1959

2,881,324

RADIATION DETECTOR

Serge A. Scherbatskoy, Tulsa, Okla.

Application January 4, 1954, Serial No. 401,978

6 Claims. (Cl. 250—71)

This invention is concerned with a radiation detector and apparatus for performing measurements in a bore hole of radiations resulting from nuclear transformations within the formations adjoining said hole, said nuclear transformations being either spontaneous and caused by natural radioactivity or induced and caused by an external agent such as a source of neutrons placed adjacent to said formations in the neighborhood of the detecting instrument.

Many measurements have been made of the above radiations and particularly gamma radiations. These gamma radiations usually result from natural radioactive substances present in the formations or from the effect of irradiation of the formations with the stream of neutrons. The measurement of these radiations has been found useful in geophysical prospecting and in many instances the measurement of the radiations obtained from a geological structure has yielded valuable information as to the nature of the structure. Thus, to cite an example, a radiation detector either alone or accompanied by a source of neutrons has been lowered into the bore hole in the earth and measurements were made at various levels of gamma rays derived from the formations.

It is not always sufficient, however, to have merely a measurement of the total gamma radiation obtained from a particular stratum. In many instances, the total amount of radiation will be the same for a plurality of strata and yet the strata will vary widely in their nature. It has been found desirable, therefore, to have more specific information about the radiation obtained from the particular geophysical specimen under observation.

This invention is therefore concerned with a method and apparatus for distinguishing between gamma rays on the basis of the energy contained in each quantum and to the application of this method by the examination of formations below the surface of the earth through the medium of a bore hole.

It is well known that gamma rays are not detected directly and that in order to be detected they interact with matter by means of one of the following three processes: photoelectric effect, Compton effect, or pair formation. The nature of the interaction with a given substance is largely determined by the energy of the gamma ray. Thus for soft gamma rays the photoelectric effect dominates, for intermediate energies the Compton effect becomes dominant, and for high energies the most important interaction is due to pair formation. My invention consists in separately detecting and separately recording those gamma rays that undergo photoelectric effect, Compton effect, and pair formation.

It is an object of the present invention to provide an improved method and improved apparatus for determining the character of unknown substances adjacent a bore hole.

Further objects and advantages of the present invention will become apparent as the following description proceeds, and the features of novelty which characterize the invention will be pointed out with particularity in the claims annexed to and forming part of this specification.

For further details of specific devices embodying the principles of this invention and for a more complete understanding of the mode of application of the principles of this invention and the numerous advantages thereof, reference may be had to the accompanying drawing in which.

Figure 1:
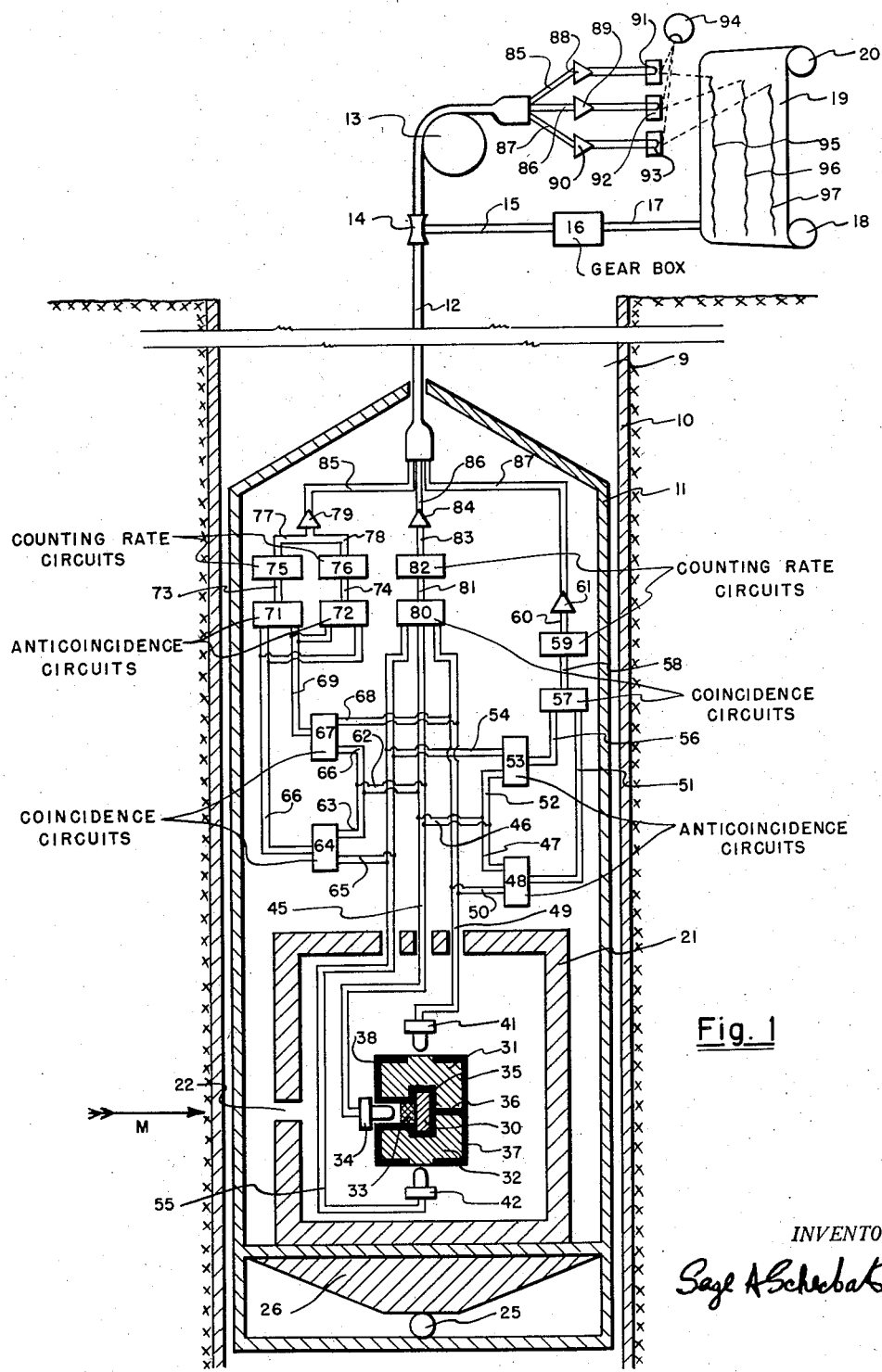
Fig. 1 illustrates diagrammatically a bore hole which peneterates the strata of the earth and the general arrangement for producing three separate logs representing gamma rays undergoing photoelectric effect, Compton effect, and pair formation.

Referring now to the drawings and particularly Fig. 1 thereof, there is schematically illustrated a drill hole 9 penetrating the formations to be explored. The bore hole is provided in the conventional manner by a tubular metallic casing designated as 10.

For the purpose of exploring the formations along the bore hole, there is provided in accordance with the present invention exploratory apparatus comprising a housing 11 which is lowered into the bore hole 9 by means of a cable 12, preferably including as a part thereof suitable insulated conductors. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 mounted on a shaft 15, and rotation of the reel and consequently of the shaft 15, is transmitted through a gear box 16 to another shaft 17 which is drivingly connected to take up spool 18 for moving a photographic film 19 from a feed spool 20 to take up spool 18.

In the lower portion of the housing 11 there is provided a suitable source of neutrons generally designated as 25, such for example, as a radium-beryllium preparation which may be enclosed in a container made of a suitable material such as glass.

The radiations transmitted from the source 25 tend to propagate themselves in all directions. I have provided, however, an absorbing block 26 formed of materials, for example, such as lead and paraffin which is relatively opaque to penetrating radiations, the paraffin being relatively opaque to neutrons and the lead being relatively opaque to other radiations. I have, therefore, prevented a direct path between the source 25 and the detecting instrument positioned above the block 26. Consequently, the radiations emitted by the source 25 are directed sideways into the adjoining formations and the amount of radiations going upwards through the absorbing block is negligible.

The radiation detector located above the block 26 is provided with a shield 21 which collimates the incoming radiations arriving at the air gap 22 along a direction indicated by the arrow M. This detector is of scintillation counter type and comprises crystals such as sodium iodide in combination with photomultipliers. The sodium iodide crystals are known to be insensitive to neutrons and sensitive to gamma rays only. These crystals are adapted to convert the incoming gamma rays into impulses of light which subsequently impinge upon the corresponding photomultipliers provided with suitable voltage supplies. We obtain thus across the output terminals of such photomultipliers current impulses which coincide with the arrival of gamma rays. More particularly, the detector comprises a sodium iodide crystal 30 completely surrounded by two sodium iodide crystals 31 and 32, adjacent one to another. The crystal 30 has its outside surface covered with an aluminum reflector 35, whereas the crystals 31 and 32 have their inside surfaces covered with aluminum reflectors 35, 36 and outside surfaces covered with aluminum reflectors 37 and 38, respectively. The light flashes produced in the crystal 30 are adapted to be transmitted by means of the reflector 35 through the light pipe 33 to a photomultiplier provided with a suitable voltage supply, the combined photomultiplier and voltage supply being designated as 34. Similarly, combined photomultiplier and voltage supplies designated by 41 and 42 are adapted to respond by means of reflectors 35, 36, 37, 38 to light flashes in the crystals 31 and 32, respectively.

The crystals 30, 31, and 32 are optically separated one from the other by the aluminum layer 36. Thus a light flash in the crystal 31 does not affect the photomultipliers 34 and 42; the light flash in the crystal 32 does not affect the photomultipliers 41 and 34; and the light flash in the crystal 30 does not affect the photomultipliers 41 and 42.

The output of the photomultiplier 34 is connected through leads 45, 46, and 47 to one of the input channels of an anticoincidence circuit 48, the other input channel of said circuit being connected to the output of the photomultiplier 41 through leads 49 and 50. The anticoincidence circuit 48 is adapted to produce a current pulse across its output leads 51 whenever a pulse is produced in the output of the photomultiplier 34, but there is no simultaneous pulse in the output of the photomultiplier 41.

Similarly, the output of the photomultiplier 34 is connected through leads 45, 46, and 52 to one of the input channels of an anticoincidence circuit 53, the other input channel of said circuit being connected to the output of the photomultiplier 42 through leads 54 and 55. The anticoincidence circuit 53 is adapted to produce a current pulse across its output leads 56 whenever a pulse is produced in the output of the photomultiplier 34, but there is no simultaneous pulse in the output of the photomultiplier 42.

The leads 51 and 56 are respectively connected to the input channels of a coincidence circuit 57, said circuit being adapted to produce an electric impulse across its output leads 58 whenever a pulse occurs simultaneously across the leads 51 and 56. Consequently, whenever a pulse occurs in the output leads 58 of the circuit 57, there is a pulse in the output of the photomultiplier 34, but at the same time there is no occurrence of pulses in either of the photomultipliers 41 and 42.

The coincidence and anticoincidence circuits are well known in the art. See, for instance, E. Segre "Experimental Nuclear Physics," John Wiley & Sons, New York, N.Y., 1953, pp. 104–108.

The output leads of the coincidence circuit 57 are connected to a counting rate circuit 59 which in turn produces across its output leads 60 a D.C. voltage representing the frequency of impulses derived from the coincidence circuit. This D.C. voltage is subsequently amplified in the amplifier 61 and transmitted by means of cable 12 to the top of the bore hole.

The output of the photomultiplier 34 is connected through leads 45, 62, and 63 to one of the input channels of a coincidence circuit 64, the other input channel of said circuit being connected to the output of the photomultiplier 42 through leads 65 and 55. The coincidence circuit is adapted to produce a current pulse across its output leads 66 whenever a pulse is produced simultaneously in the outputs of the photomultipliers 34 and 42.

Similarly, the output of the photomultiplier 34 is connected through leads 45, 62, and 66 to one of the input channels of a coincidence circuit 67, the other input channel of said circuit being connected to the output of the photomultiplier 41 through leads 68 and 49. The coincidence circuit is adapted to produce a current pulse across its output leads 69 whenever a pulse is produced simultaneously in the outputs of the photomultipliers 34 and 41.

The leads 66 and 69 are respectively connected to the input channels of two anticoincidence circuits 71 and 72. The circuit 71 is adapted to produce a current across its output leads 73 whenever a pulse occurs across the leads 66, but does not occur across the other leads 69. On the other hand, the circuit 72 is adapted to produce a current impulse across its output leads 74 whenever a pulse occurs across the leads 69, but does not occur across the leads 66. The leads 73 and 74 are respectively connected to counting rate circuits 75, 76. The circuit 75 produces across its output leads 77 a D.C. voltage having magnitude representing the frequency of input pulses across leads 73 and therefore represents the frequency of occurrences at which pulses are produced simultaneously by photomultipliers 34, 42, but there is no simultaneous occurrence of a pulse in the output of the photomultiplier 41. Similarly, the circuit 76 produces across its output leads 78 a D.C. voltage having magnitude representing the frequency of impulses across leads 74 and, therefore, represents the frequency of occurrences at which pulses are produced simultaneously by photomultipliers 34, 41, but there is no simultaneous occurrence of a pulse in the output of the photomultiplier 42.

The D.C. voltages across the leads 77 and 78 are connected in series and applied to an amplifier 79. Consequently, the voltage output of the amplifier 79 represents the rate of occurrence at which a pulse is simultaneously produced by the photomultiplier 34 and by one of the photomultipliers 41, 42. This voltage is transmitted by means of the cable 12 to the top of the bore hole.

The outputs of the photomultipliers 34, 41, and 42 are respectively connected to the input channels of a triple coincidence circuit 80, said circuit being adapted to produce a pulse across its output leads 81 whenever three pulses arrive in coincidence to its input channels. The output leads of the coincidence circuit 80 are connected to a counting rate circuit 82 which in turn produces across its output leads 83 a D.C. voltage representing the frequency of impulses derived from the coincidence circuit. This D.C. voltage is subsequently amplified in the amplier 84 and transmitted by means of cable 12 to the top of the drill hole.

The outputs of the amplifiers 61, 79, and 84 are transmitted through insulated conductors associated with the cable 12 to the top of the drill hole and are subsequently amplified in amplifiers 88, 89, 90 located above the opening to the bore hole and is connected to the galvanometer coils 91, 92, and 93. The galvanometer coils have attached thereto suitable mirrors in a manner well known to those skilled in the art, and are adapted to reflect beams of light dervived from a source 94, thereby effectively producing on the sensitive film 19 a record comprising three traces 95, 96, and 97, representing respectively the variations of the voltage applied to the galvanometer coils 91, 92, and 93.

The incoming gamma rays can be absorbed in the central crystal 30 in three different ways: by photoelectric effect, Compton effect, and pair formation.

In the photoelectric effect, the incoming photon ejects an orbital electron from an atom of the crystal. The photon disappears in the process and the electron slows down in the crystal, producing a pulse of light which in turn produces a current impulse in the output of the photomultiplier 34. Since the photon has entirely disappeared in the crystal 30, no further effects are produced in the crystals 31 and 32. Consequently, a photoelectric absorption is characterized by an occurrence of a pulse in the photomultiplier 34, while the photomultipliers 41 and 42 produce no pulses. As explained above, such an occurrence is characterized by a pulse across the output leads 58 of the coincidence circuit 57. Thus the output voltage of the counting rate circuit 59 represents the frequency of photoelectric absorption in the crystal 30. This voltage is in turn recorded in a manner well known in the art upon the photosensitive film 19 in form of a trace 95. Consequently, the trace 95 represents the variation with depth of the frequency of arrival of photons that underwent photoelectric absorption in the crystal 30.

In the Compton effect the incoming photon is scattered by one of the electrons in the crystal. As a result of such scattering, the electron has acquired kinetic energy, thus producing in turn a current impulse in the output of the photomultiplier 34. The scattered photon usually escapes from the crystal 30 and interacts with one of the crystals 31, 32. As a result of such interaction, we obtain in either of the crystals 31, 32 a flash of light which in turn produces a current pulse either in the output of the photomultiplier 41 or of photomultiplier 42. Consequently, the Compton effect is characterized by a simultaneous occurrence of pulses either in the photomultiplier 34, 41 or in the photomultipliers 34, 42. As explained above, the frequency of such an occurrence is characterized by a voltage across the output leads of the amplifier 79. This voltage is in turn recorded in the manner well known in the art upon the photosensitive film 19 in form of a trace 96. Consequently, the trace 96 represents the variation with depth of the frequency of arrival of photons that underwent Compton absorption in the crystal 30.

In the process of pair production, the incoming photon vanishes completely and a positron-electron pair is created in the crystal 30. Both electron and the positron slow down, producing ionization and excitation of surrounding atoms and thus causing a flash of light in the crystal 30 and a corresponding current impulse in the output of the photomultiplier 34. After the positron has been reduced in energy, it makes a unique and final interaction with an orbital electron. In this interaction, the pair of positive and negative electrons unite and annihilate themselves in the formation of two photons that are ejected in opposite directions. These photons designated as annihilation quanta interact simultaneously with the crystals 31 and 32 and thus produce impulses in the outputs of the multipliers 41 and 42 that are simultaneous and coincident with the impulse in the output of the photomultiplier 34. Consequently, a pair formation is characterized by a simultaneous occurrence of a pulse across the output leads 81 of the coincidence circuit 80. Thus the output voltage of the counting rate circuit 82 represents the frequency of pair formation in the crystal 30. This voltage is in turn recorded in a manner well known in the art upon the photosensitive film 19 in the form of a trace 97 and represents the variation with depth of the frequency of arrival of photons that underwent the process of pair formation.

It is well known that in the sodium iodide crystal the photoelectric effect is dominant for energies below 0.45 m.e.v.; the Compton effect appears at 1.8 m.e.v. and is dominant in the energy range from 3 m.e.v. to 7 m.e.v.; the pair formation appears above 1 m.e.v. and becomes dominant at 7 m.e.v. Thus the curves 95, 96, 97 corresponding to these three processes represent relative energy distributions of gamma rays at various depths in the bore hole.

Figure 2:
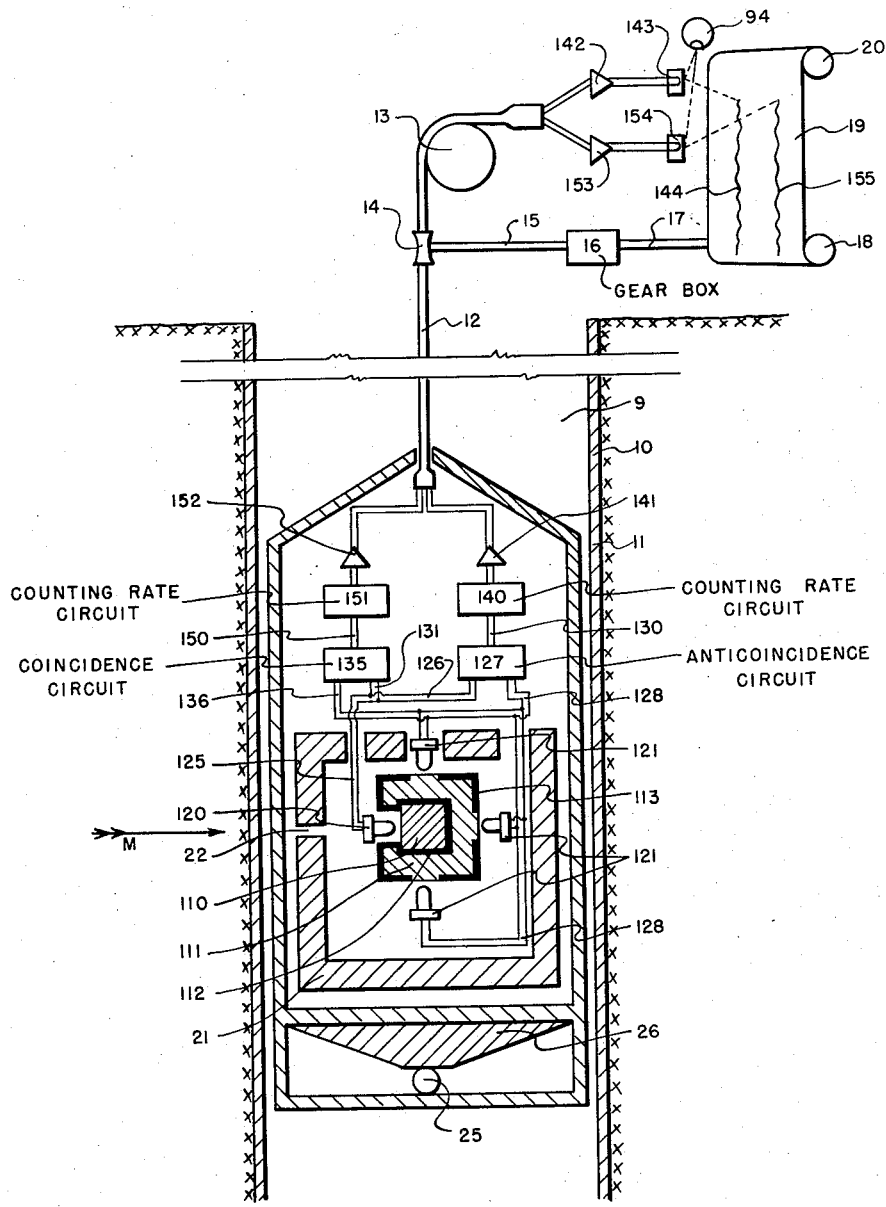
Fig. 2 shows another embodiment of my invention for producing a log representing gamma rays undergoing photoelectric effect and a log representing gamma rays undergoing Compton effect and pair formation.

Consider now Fig. 2 showing a modified embodiment of my invention for separately recording the gamma rays participating in photoelectric effect and all remaining gamma radiations. The elements that are common to Fig. 1 and Fig. 2 are designated by the same numerals. Referring now more particularly to Fig. 2, the detector positioned above the shield 26 comprises a sodium iodide crystal 110 that responds to gamma rays only and not to neutrons, said crystal being completely surrounded by a relatively larger sodium iodide crystal 111. The crystal 110 has its outside surface covered with an aluminum reflector 112 whereas the crystal 111 has its inside surface covered with aluminum reflector 112 and outside surface covered with aluminum reflector 113.

The light flashes in the crystal 110 are adapted to be transmitted by means of the reflector 112 to the photomultiplier 120, whereas the light flashes produced in the crystal 111 are adapted to be transmitted by means of reflectors 112 and 113 to one or more photomultipliers 121, said photomultipliers being connected in parallel. The output of the photomultiplier 120 is connected through leads 125, 126 to one of the input channels of an anticoincidence circuit 127, the other input channel of said circuit being connected to the output of each photomultiplier 121 through leads 128. The anticoincidence circuit 127 is adapted to produce a current pulse across its output leads 130 whenever a pulse is produced in the output of the photomultiplier 120, but there is no simultaneous pulse in the output of either of the photomultipliers 121.

Similarly, the output of the photomultiplier 120 is connected through leads 125, 131 to one of the input channels of a coincidence circuit 135, the other input channel of said circuit being connected to the output of the photomultipliers 121 through leads 136 and 128.

The output leads 130 of the anticoincidence circuit 127 are applied to a counting rate circuit 140, the output of said circuit being in turn transmitted through the amplifier 141, cable 12 to the amplifier 142, to the galvanometer coil 143. Thus we obtain on the film 19 a trace 144, representing the record of the output of the counting rate circuit 140 in correlation with depth at which the measurements were made.

Similarly, the output leads 150 of the coincidence circuit 135 are applied to a counting rate circuit 151, the output of said circuit being in turn transmitted through the amplifier 152, cable 12, amplifier 153 to the galvanometer coil 154. Thus we obtain on the film 19 a trace 155 representing a record of the output of the counting rate circuit 151 in correlation with depth.

It is apparent that whenever a photon undergoes photoelectric effect in the crystal 110 it is completely absorbed by said crystal and produces a current pulse in the photomultiplier 120, and there is no simultaneous occurrence of a pulse in the photomultipliers 121. Consequently, whenever a photoelectric effect takes place we obtain a pulse in the output of the anticoincidence network 127, and the frequency of such pulses is represented by the voltage across the output leads of the counting rate meter 140. This voltage is transmitted to the top of the bore hole to produce upon the film 144 a trace representing the variation of said voltage with depth, said trace representing the variation in the portion of the gamma ray flux undergoing photoelectric effect.

If Compton effect takes place, we obtain a pulse in the photomultiplier 120 due to the incoming gamma ray's interacting with the crystal 110 and a simultaneous pulse in at least one of the photomultipliers 121 due to the gamma ray scattered in the crystal 110 and interacting with the crystal 111.

Similarly, if pair formation takes place in the crystal 110 we obtain a pulse in the photomultiplier 120 due to the positron and electron absorbed in the crystal 110 and simultaneously we obtain another pulse in at least one of the photomultipliers 121 due to the annihilation photons caused by the disappearance of positron in the crystal 110, said annihilation photons interacting with the crystal 111.

Consequently, whenever a gamma ray undergoes a Compton effect or a pair formation, we obtain simultaneous pulses in the photomultipliers 120 and 121 which in turn produce an output pulse in the output leads of the coincidence network 135. Consequently, the voltage across the ouput leads of the counting rate circuit 151 represents the frequency of occurrence of gamma rays that undergo either Compton effect or pair formation. This voltage is transmitted to the top of the bore hole. We obtain this upon the film 155 a trace representing the variation of said voltage with depth, said trace representing the variation of the gamma ray flux undergoing either Compton effect or pair formation.

It is apparent that the above method of separating gamma rays participated in the three processes can be applied to other forms of well logging. For instance, we can eliminate the neutron source 25 and thus perform measurements on gamma rays radiated by the naturally radioactive elements that are present in the formation. Or we can replace the neutron source 25, by a source such as radium that emits gamma rays but not neutrons. In the latter case, we would perform measurements on gamma rays derived from the radium source and scattered by the formations.

It will be obvious to those skilled in the art that numerous modifications other than those herein disclosed can be made without departing from the scope or spirit of this invention.

I claim:

1. In an apparatus for radiological logging of bore holes, a housing adapted to be lowered into a bore hole, said housing comprising a first scintillating detector, second and third scintillating detectors adjacent to said first detector and positioned on both sides thereof, each of said three detectors being adapted to produce an impulse in response to a gamma ray, shield means operative to admit to said inner detector only rays arriving in substantially a single predetermined plane, an anticoincidence circuit connected to said first detector and to said second detector for providing an output signal at the occurrence of an impulse at said first detector that is not simultaneous with an impulse at said second detector, another anticoincidence circuit connected to said first detector and to said third detector for providing an output signal at the occurrence of an impulse at said first detector that is not simultaneous with an impulse at said third detector, a coincidence network connected to said two anticoincidence networks for providing an output impulse whenever said two output signals arrive in coincidence, a counting rate circut connected to said coincidence network for providing a voltage representing the rate of occurrence of said output impulses, means for determining the depth at which said housing is lowered, and means for recording the output of said counting rate circuit in correlation with depth.

2. In an apparatus for radiological logging of bore holes, a housing adapted to be lowered into a bore hole, said housing comprising a source of neutrons arranged to radiate neutrons into the formations surrounding said bore hole, whereby gamma rays and neutrons are directed toward said bore hole as a result of interaction of said neutrons with said formations, a first scintillating detector conveniently distant from said source, second and third scintillating detectors adjacent to said first detector and positioned on both sides thereof, each of said three detectors being adapted to produce an impulse in response to a gamma ray, shield means operative to admit to said inner detector only rays arriving in substantially a single predetermined plane, an anticoincidence circuit connected to said first detector and said second detector for providing an output signal at the occurrence of an impulse at said first detector that is not simultaneous with an impulse at said second detector, another anticoincidence circuit connected to said first detector and to said third detector for providing an output signal at the occurrence of an impulse at said first detector that is not simultaneous with an impulse at said third detector, a coincidence network connected to said two anticoincidence networks for providing an output impulse whenever said two output signals arrive in coincidence, a counting rate circuit connected to said coincidence network for providing a voltage representing the rate of occurrence of said output impulses, means for determining the depth at which said housing is lowered, and means for recording the output of said counting rate circuit in correlation with depth.

3. In an apparatus for radiological logging of bore holes, a housing adapted to be lowered into a bore hole, said housing comprising a first scintillating detector, second and third scintillating detectors, adjacent said first detector and positioned on opposite sides thereof, collectively substantially surrounding said first detector, each of said three detectors being adapted to produce an impulse in response to a gamma ray, a first anticoincidence circuit connected to said first detector and said second detector for providing output signals at the occurrence of impulses at said first detector that are not simultaneous with impulses at said second detector, a second anticoincidence circuit connected to said first detector and said third detector for providing output signals at the occurrence of impulses at said first detector that are not simultaneous with impulses at said third detector, a first coincidence network connected to said first and second anticoincidence circuits for providing an output impulse whenever output signals from said respective anticoincidence circuits occur in coincidence, a second coincidence network connected to said first and second detector for providing output signals corresponding to the occurrence of simultaneous impulses at said first and second detectors, a third coincidence network connected to said first detector and to said third detector for providing output signals corresponding to the occurrence of simultaneous impulses at said first and third detectors, a third anticoincidence circuit connected to said second and third coincidence networks for providing an output impulse whenever one of said second or third coincidence networks produces an output signal that is not in coincidence with an output signal from the other, a counting-rate circuit connected to said first coincidence network for providing a voltage representing the rate of occurrence of output impulses therefrom, and a second counting-rate circuit connected to said third anticoincidence circuit for providing a voltage representing the rate of occurrence of output impulses therefrom, means for determining the depth of said housing, and means for recording the output voltages of said counting-rate circuits as a function of depth.

4. In an apparatus for radiological logging of bore holes, a housing adapted to be lowered into a bore hole, said housing comprising a first scintillating detector, second and third scintillating detectors, adjacent said first detector and positioned on opposite sides thereof, collectively substantially surrounding said first detector, each of said three detectors being adapted to produce an impulse in response to a gamma ray, a first anticoincidence circuit connected to said first detector and said second detector for providing output signals at the occurrence of impulses at said first detector that are not simultaneous with impulses at said second detector, a second anticoincidence circuit connected to said first detector and said third detector for providing output signals at the occurrence of impulses at said first detector that are not simultaneous with impulses at said third detector, a first coincidence network connected to said first and second anticoincidence circuits for providing an output impulse whenever output signals from said respective anticoincidence circuits occur in coincidence, a triple-coincidence network connected to all three of said detectors for producing output impulses corresponding to occurrence of impulses simultaneously in all three of said detectors, a first counting-rate circuit connected to said first coincidence network for providing a voltage representing the rate of occurrence of output impulses therefrom, a second counting-rate circuit connected to said triple-coincidence network for producing a voltage representing the rate of occurrence of output impulses therefrom, means for determining the depth of said housing, and means for recording the output voltages of said counting-rate circuits as a function of depth.

5. Apparatus according to claim 3 having also a triple-coincidence network connected to all three of said detectors operative to provide output impulses corresponding to occurrence of simultaneous impulses in all three of said detectors, a third counting-rate circuit connected to said triple-coincidence network for producing an output voltage representing the rate of occurrence of output impulses therefrom, and means for recording said last-mentioned output voltage as a function of housing depth.

6. In an apparatus for bore-hole logging, a housing adapted to be lowered into a bore hole, said housing comprising a first scintillating detector, second detector means comprising at least one scintillating element, said second detector means being disposed outside of and at least largely surrounding said first detector, both said first detector and said second detector means being adapted to produce electric impulses responsively to interaction of gamma rays therewith, a first anticoincidence means fed by said first detector and said second detector means operative to transmit impulses from said first detector which are not accompanied by substantially simultaneous impulses from said second detector means, coincidence means fed by said first detector and said second detector means operative to transmit impulses from said first detector which are accompanied by substantially simultaneous impulses from said second detector means, and counting-rate circuits respectively fed by said anticoincidence means and said coincidence means operative to develop voltages respectively representative of the rate of occurrence of output impulses therefrom, means for determining the depth of said housing, and means for recording the output voltages of said counting-rate circuits as a function of depth.

References Cited in the file of this patent
UNITED STATES PATENTS

| | | |
|---|---|---|
| 2,648,012 | Scherbatskoy | Aug. 4, 1953 |
| 2,659,011 | Youmans et al. | Nov. 10, 1953 |

OTHER REFERENCES

Two-Crystal Gamma-Ray Scintillation Spectrometer, by R. E. Connally, from The Review of Scientific Instruments, vol. 24, No. 6, June 1953, pp. 458, 459.

An Anticoincidence Gamma-Ray Scintillation Spectrometer, by Richard D. Albert, from The Review of Scientific Instruments, vol. 24, No. 12, December 1953, pp. 1096–1101.